M. W. MOORE.
ACETYLENE LAMP.
APPLICATION FILED SEPT. 22, 1909.
1,008,923.
Patented Nov. 14, 1911.
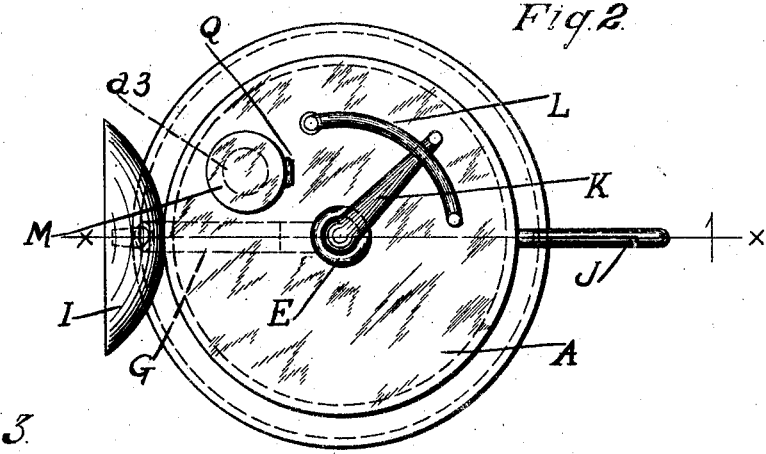
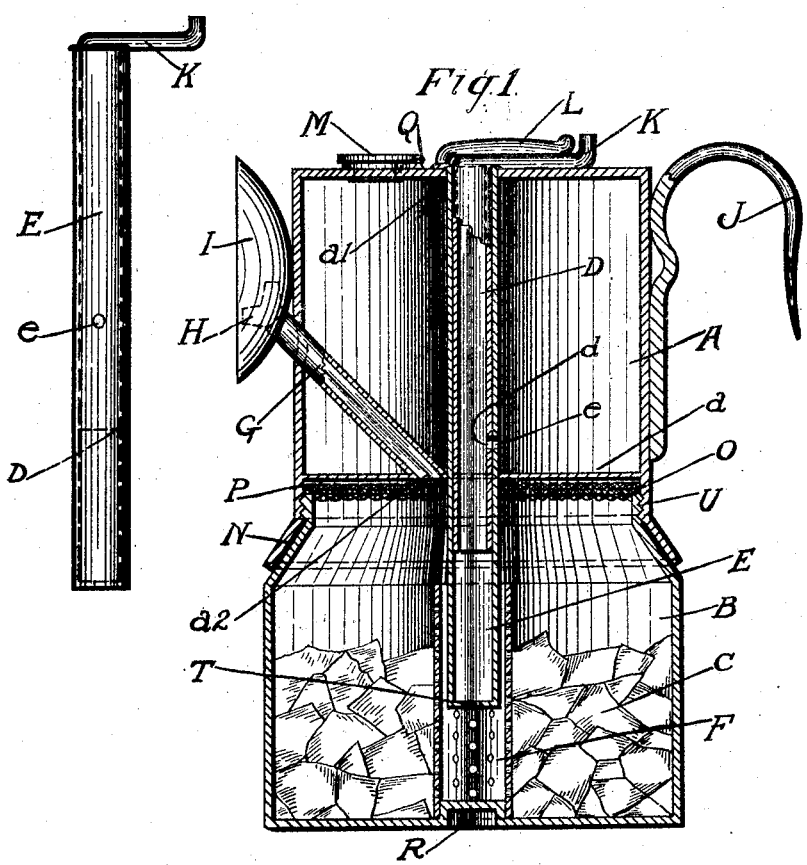
Witnesses:
Inventor
MARTIN WILLIAM MOORE.
by Atty. N. DuBois.

UNITED STATES PATENT OFFICE.

MARTIN WILLIAM MOORE, OF SPRINGFIELD, ILLINOIS, ASSIGNOR OF ONE-THIRD TO GEORGE CONLISK AND ONE-THIRD TO JOSEPH LOPEZ, OF SPRINGFIELD, ILLINOIS.

ACETYLENE-LAMP.

1,008,923.  Specification of Letters Patent.  Patented Nov. 14, 1911.

Application filed September 22, 1909. Serial No. 519,094.

*To all whom it may concern:*

Be it known that I, MARTIN WILLIAM MOORE, a citizen of the United States, residing at the city of Springfield, in the county of Sangamon, and in the State of Illinois, have invented a new and useful Improvement in Acetylene-Lamps, of which the following is a specification.

This invention relates to lamps for generating and burning acetylene gas.

The general purposes of the invention are to provide a lamp of simple construction, of low first cost and effective in operation.

More specific purposes of the invention are: to provide means for supplying water in controllable quantities within the carbid box; means for distributing the water in the mass of carbid; means for filtering the gas; and means to prevent accidental closing of the valve controlling the water supply.

With these ends in view my invention consists in the novel features of construction and combinations of parts shown in the annexed drawing, to which reference is hereby made and hereinafter particularly described and finally recited in the claim.

Similar reference letters and characters designate like parts in the several views.

Figure 1 is a vertical axial section through the lamp; Fig. 2 is a top plan of the lamp; and Fig. 3 is an enlarged detail of the valve.

The lamp body is of sheet metal and comprises a water reservoir A and a carbid box B, connected by a screw U in the usual manner. A perforated sleeve F occupies a vertical position in the carbid box B in line with the tube E. The lower end of the sleeve F fits snugly around a central boss R pressed in the metal of the bottom of the box and the boss prevents displacement of the sleeve. The sleeve is kept in place on the boss by the friction of the parts and may be readily removed for cleaning the sleeve. Water percolates through the small openings of the sleeve F, into the mass of carbid C. A rubber gasket N, interposed between the parts A and B, prevents leakage of gas or water. A screen O, of fine woven wire or other suitable reticulate material, is supported in a horizontal position on the tube E, below the diaphragm $a$, and above the upper end of the carbid box. Filtering material, such as cotton fiber, P fills the space between the diaphragm and the screen O, so that the gas generated in the carbid box and passing through the filtering material will be dried and purified before it reaches the burner H. At the upper end of the reservoir is an opening $a^3$, through which water is introduced into the reservoir. A cap M, covers the opening $a^3$ and is mounted to turn on a hinge Q, on the upper end of the reservoir. A hook J, secured on the outer wall of the reservoir, serves as a handle, or as a means for supporting the lamp on a suitable support, such as the cap of the user. An inclined pipe G, covers an opening $a^2$, in the diaphragm and extends through the outer wall of the reservoir and has at its upper end a burner H of the usual construction. A reflector I, secured on the reservoir A, surrounds the burner H and reflects the light thereof.

A tube E, open at its upper end, is fixed centrally in a vertical position on the diaphragm $a$, of the reservoir A, and extends upwardly through the central opening $a^1$ in the top of the reservoir, and extends downwardly into the perforated sleeve F, and has at its lower end a small opening T, through which the water drips into the perforated sleeve and thence percolates to the mass of carbid C. An inner tube D, closed at its upper end, fits snugly within and is adapted to turn in the tube E. The tube E has a port $e$, in the same plane with a similar port $d$ extending through the outer wall of the inner tube D. The relation of the tubes D and E and the ports $d$ and $e$ are such that partial rotation of the tube D within the tube E, will serve to open or close the ports to control the supply of water entering through the tube D.

A handle K, is fixed on the upper end of the tube D and extends under and may be turned in contact with a guard L, on top of the reservoir A, so that the guard will hold the handle in different positions, according to the degree of rotation of the inner tube D, to open or close the ports $d$ and $e$; and will prevent withdrawal of the tube D from the outer tube E. The guard L also serves to keep the tube D in such position that the ports $d$ and $e$ always occupy the same horizontal plane. The handle K is in such position on the tube D that when the ports $d$ and $e$ are completely open the handle will be adjacent to the free end of the guard L and when the handle is turned to cause complete closing of the ports the handle will be adjacent to the leg of the guard; and intermediate positions of the handle will indicate to the user the different intermediate degrees of opening of the ports.

The construction described admits of very accurate adjustment of the ports $d$ and $e$, relatively to each other to accurately gage the supply of water to be applied on the carbid, or to completely shut off the water supply.

In practical use, carbid C will be placed in the box, the box will then be connected with the reservoir A and a sufficient quantity of water will be placed in the reservoir. When the ports $d$ and $e$ are closed there will not be any flow of water from the reservoir into the carbid box, but upon turning the inner tube D, by means of the handle K, to open the ports $d$ and $e$ to the desired extent, a perfectly controlled supply of water will pass through the tube D, into the lower part of the tube E, and thence through the opening T, into the perforated sleeve F and thence it will seep into the mass of carbid and cause the generation of gas, which will pass through the filtering material P to the burner H.

Having fully described my invention what I claim as new and desire to secure by Letters Patent is:

In a lamp, the combination of a carbid box, a detachable perforated sleeve extending upwardly within the box, a reservoir detachably connected with the carbid box, a first straight tube open at both ends, secured centrally on the reservoir and extending downwardly into the sleeve within the box and having a port extending through the wall of said tube, a complemental rotative straight water-control tube closed at its upper end and gaged for gas-tight contact with the inner wall of the outer tube along the entire length of the inner tube and having a port extending through the wall of the inner tube in the plane of the port of the outer tube, a radial handle on the inner tube adapted to turn the tube to vary the opening of the ports through the walls of the outer and inner tubes to admit water into the inner tube to drop therefrom directly into the central sleeve within the carbid box, and an immovable guard on the reservoir adapted to permit horizontal movement of the handle and contacting with the handle to prevent upward movement of the inner tube, to keep the port of the inner tube in the plane of the port of the outer tube.

MARTIN WILLIAM MOORE. [L. S.]

Witnesses:
MARIE SCHLOSSER,
MABEL BROWN.